United States Patent

Barron

[15] 3,681,573

[45] Aug. 1, 1972

[54] VARIABLE DEPTH SONAR RANGE PRODUCTION COMPUTER

[72] Inventor: Daniel Barron, 9326 Edmunston Rd., Greenbelt, Md. 20770

[22] Filed: June 18, 1971

[21] Appl. No.: 154,572

[52] U.S. Cl. ............................................ 235/88, 235/78
[51] Int. Cl. .................................................. G06c 3/00
[58] Field of Search .............................. 235/88, 83, 98

[56] References Cited

UNITED STATES PATENTS 2,769,593  11/1956  Safranek et al. ................ 235/88
3,567,114  3/1971  Frees .............................. 235/88

Primary Examiner—Stephen J. Tomsky
Attorney—R. S. Sciascia et al.

[57] ABSTRACT

This disclosure is directed to a hand operated device for providing sufficient sonar range information for an anti-submarine warfare planner to properly select a transducer depth to be used and to provide the operator with the range of the day. The range selected is for snorkeling targets and targets operating at best depth.

2 Claims, 4 Drawing Figures

INVENTOR
DANIEL BARRON

VARIABLE DEPTH SONAR RANGE PRODUCTION COMPUTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore, range has been determined by a sonar operator by the use of prepared tables, diagrams, large expensive computers, etc., wherein the operator obtains values and sets these values into an expensive computer which computes the range.

SUMMARY OF THE INVENTION

The device of this invention is of simple construction which may be held in ones hand for operation. The device includes relatively movable elements upon which information has been placed. The cooperation of the elements in combination with data printed thereon permits one to determine range for various conditions of the sea. The range data has been determined for a transducer at different depths using sea surface temperature of 65° Fahrenheit, gradients at different layer depths and thermocline depth in feet. Two separate discs and a cursor are operated separately to determine the best range for the conditions.

STATEMENT OF THE OBJECTS

It is therefore an object of the invention to provide a device for determining range within which a transducer will detect an underwater target.

Another object is to provide a simple range computing device which may be used by unskilled as well as skilled personnel.

Yet another object is to provide range distance with respect to the different aspects of a target upon which a transducer detector is located.

While still another object is to provide range information for proper selection of transducer depth for the surrounding conditions.

Other and more specific objects will become apparent from a reading of the following specification when considered with the drawings.

DESCRIPTION OF THE PREFERRED EMBODIMENT

Figure 2:
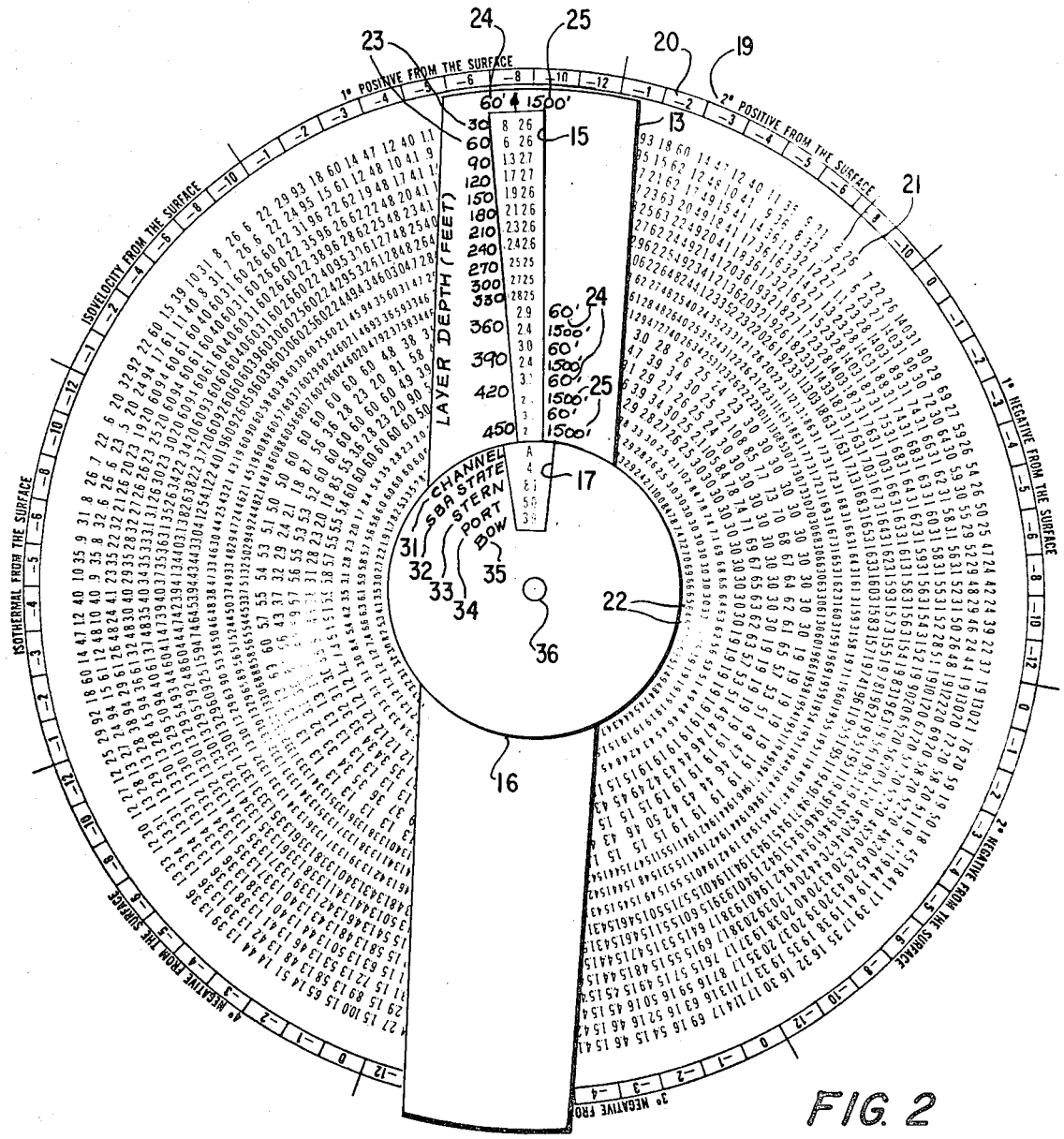
FIG. 2 is a top view illustrating a cursor and small disc positioned above a large disc having desired range information thereon.
Figure 1:
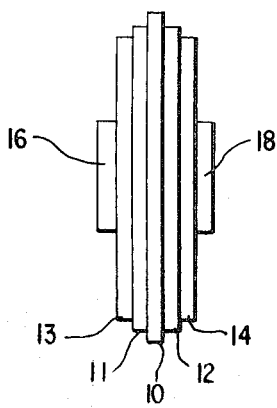
FIG. 1 illustrates a cross section of the device illustrating the relative parts.
Figure 3:
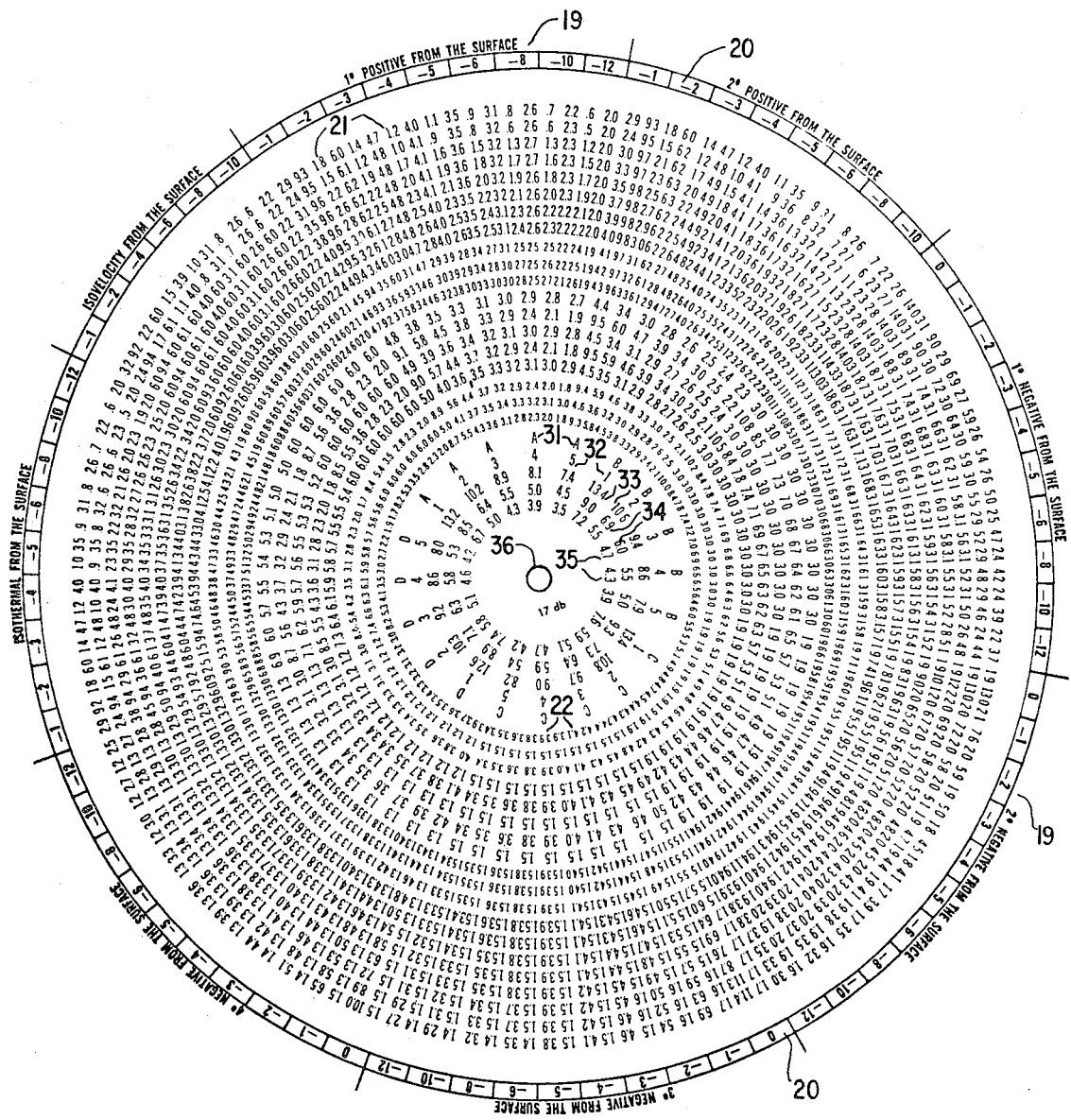
FIGS. 3 and 4 illustrate different discs with different range information thereon for the upper and lower sides respectively.

Now referring to the drawings there is shown by illustration a hand operated sonobuoy sonar prediction device made in accordance with the teaching of this invention. As shown, the device includes a base 10 upon which is mounted disc 11 and 12 on opposite sides of the base. Cursors 13 and 14 including a window 15 are mounted outwardly of each disc to cooperate with the disc to provide desired range information. Centrally of the cursors are smaller discs 16 and 18 having a window 17 therein. Each separate disc and each cursor on opposite sides of the base contain the same arrangement of information, respectively. On each disc 11 and 12, the outermost circle of information 19 represents temperature gradients, degrees Fahrenheit per 100 feet from the surface. The next inner circle 20 of information represents the second temperature gradients which extend 400 feet below the first gradient. The next series of rings of information with different radial numerical values 21 are range information obtained for various combinations of hydrophone depth, bathythermograph types, and sonobuoy source power. The outermost eleven circles of range data represent the range data for different layer depths from 30 feet to 450 feet beginning with the outermost circle. The range data 21 are radially aligned under each of the different gradients 20, in pairs, such that the data on left (lesser value) in the pair on the same circle is for a transducer placed at a shallow depth and the data on the right of the pair (greater value) is for a transducer placed at a much greater depth.

In order to present range data that can be more clearly seen for layer depths down to 450 feet, the data 22 in each of the radial range data lines, inwardly, for the 12th through the 19th circle, alternately represent range data for a transducer placed at the shallow and much greater depth, respectively. The range data on each disc is made much clearer when viewed through the radially aligned slot or window 15 in the cursor 13, as shown in FIG. 2. The layer depth values, in feet, 23 and the depths 24 and 25 of the transducers at 60 ft and 1,500 ft for the range data alignments are denoted on the cursor. The circles of data radially inwardly of the range data, which is under the smaller disc 16 in the inner circle, indicates the figure of merit ranges for different Buoy-Sonar channels 31, for different sea states 32, the stern 33, the quarter 34, and bow 35 range data, respectively.

The device is assembled such that the two large discs 11 and 12 on opposite sides of the base are stationary with respect to the base and the cursors 13 and 14 and smaller disc 16 and 18 on opposite sides are secured to pivot about the center 36. The slots or openings in the cursor and smaller discs are so arranged that they align with the data on the larger disc for viewing certain data as necessary for range determination.

The device provides the user with two different ranges, a Ray Path Range and a Figure of Merit Range, the former obtained by use of the data on the large disc in combination with the cursor, and the latter range data is obtained by the range data on the large disc under the smaller disc in combination with the smaller disc. The range viewed through the slots of the cursor above the upper or lower discs 11 and 12 are the Ray Path Ranges. The ranges viewed through the slot of the smaller discs fixed relative to discs 11 and 12 are the Figure of Merit Ranges. The Figure of Merit Range values are determined by well known sonar formulas which may be found in Principles of Underwater Sound for Engineers by Robert Urich, published by McGrow Hill, 1967.

The formula is as follows:

$$Fom = S_L - 2T_L = T_S = N_L - di = dt \text{ where}$$

$S_L$ = source level
$T_L$ = transmission loss
$T_S$ = target strength
$N_L$ = noise level
$di$ = directivity index
$dt$ = detection threshold The Ray Path Range is based on environmental parameters. These parameters – layer depth, and temperature gradient below the layer are determined on site or from historical or predicted data. The numbers on the outer edge of the disc are temperature gradients, degrees Fahrenheit per 100 feet from the surface. The next inner row of numbers are the second temperature gradients which extend 400 feet below the first gradient in feet. The numbers on the rotatable cursor are the extents of the first gradient from 0 to 450 feet in increments of 30 feet. The numbers on the disc radially aligned with the numbers 60 and 1,500 are the ranges corresponding with the gradient depths for a 60 feet transducer and a 1,500 foot transducer, respectively. The groups of letters A, B, C, and D, 31, refer to BUOY-SONAR Channels for different sea states 1–5, 32. The values radially inwardly of the channel-sea state are the ranges in directions off the stern 33, quarter deck 34, and bow 35 of the ship. The values 17 db and 11 db shown near the center of the two discs refers to the recognition differential of 17 db and 11 db applicable for a one second pulse when using the Aural Detection Mode.

The discs 11 and 12 on each side of the base are for different gradients as shown by the values on the outer ring. The range values are for the same transducer depth but for the different environmental parameters. The disc 12 on the opposite side of the base from disc 11 could be for the same environmental parameters as for the range data on disc 11, however, the range data may be for different transducer depths. Thus, the operator can readily obtain different range data for different depth transducers.

Figure 4:
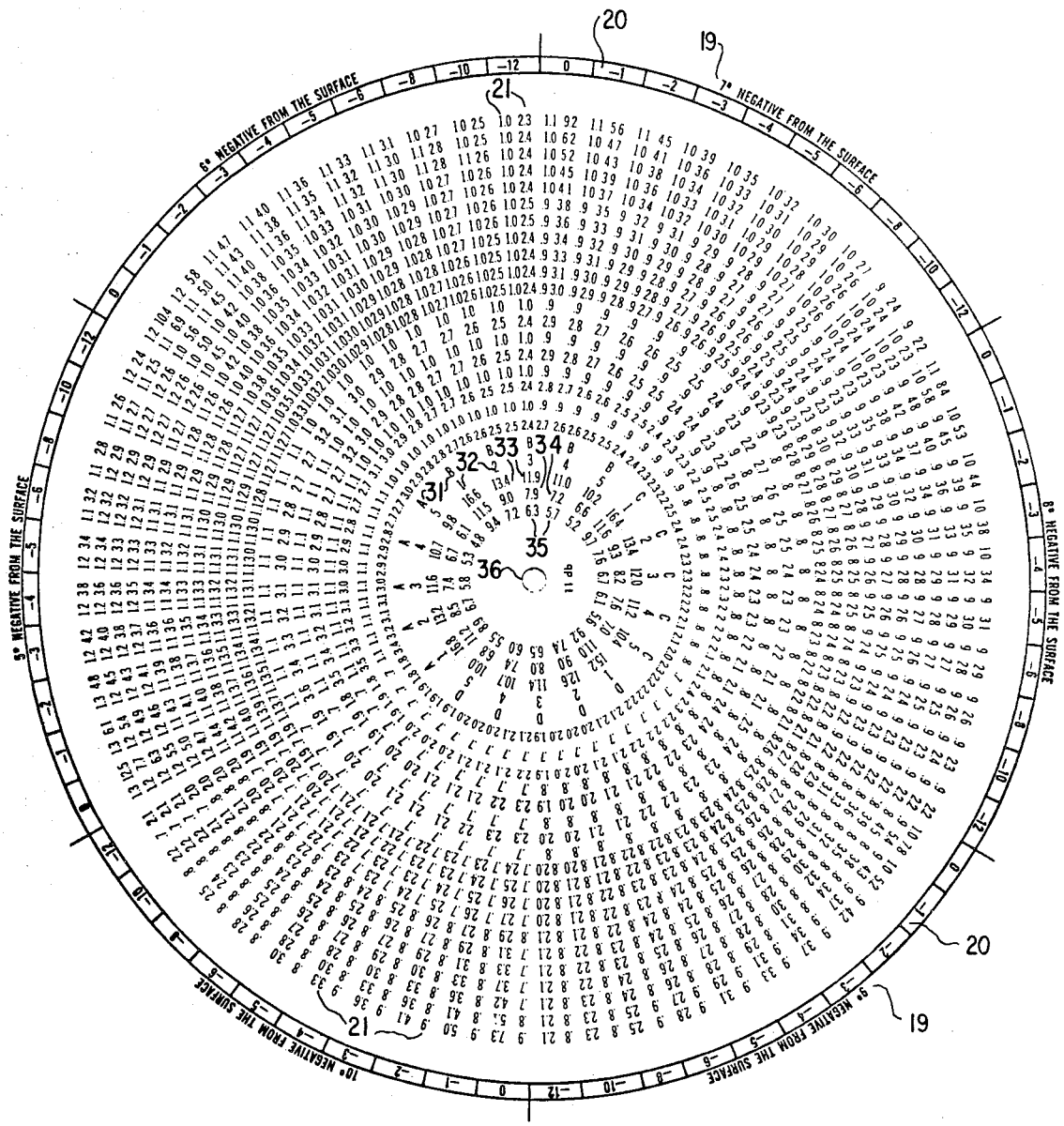

FIG. 4 illustrates a disc having different outer ring values of temperature gradients with appropriate range data for the different environmental parameters. Different disc may be made for all different environmental parameters and made into the device described above to determine range data for all different situations. The range data shown on the disc are determined from the following formula:

$$\Delta X = D \cot (\theta_1 + \theta_2/2) \text{ where}$$

$\Delta X$ is range in kiloyards
$D$ is thickness of layers
$\theta_1$ is instant angle of the ray
$\theta_2$ is final angle of ray The device has been shown using a single large disc containing range data on each side of the base. The device may be made with more than one large disc on each side by cutting away one of the entire sections included inwardly of the outer ring temperature gradient. Thus, each disc would have one less section but would create a window through which the range data for different temperature gradients could be seen for determining range data. The inner most disc could be fixed or rotatable and not have a cut out section since it is not necessary to view anything below the innermost disc.

Since the range data indicated on the disc has been determined from environmental parameters, the only requirement for determining range data through use of this device is to obtain the temperature gradient and rotate the cursor to that section such as that shown in FIG. 2 where the cursor is positioned relative to the Isovelocity from the Surface Section directed toward the −8 value in the second ring or circle of numbers which is the second temperature gradient which extends 400 feet below the first gradient. Assuming the target is at a layer depth of 300 feet, observe the range data opposite the 300 value on the cursor. Therefore, the range of the 60 foot transducer will be 2.4 Kiloyards and the range for the 1,500 foot transducer will be 60 Kiloyards. The same operation is carried out for the smaller disc on the same side of the base for the proper channel, sea state and aspect of the target. The range is the range associated with the transducer at the desired depth. The depth is the one which gives best range consistant with the power limited range.

Since the range determining device is small and handy, several devices could be made up for use by the same operator from different environmental parameters and for different sonar types. This way the operator will have different devices readily available for the different situations encountered.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A device for providing sonar range information for an operator to determine the best depth of positioning a transducer and the range for the day; which comprises,
   a flat base,
   at least one disc positioned on opposite sides of said base,
   a cursor positioned outwardly of said disc on each side of said base, and rotatable about the center relative thereto,
   said cursor including a radially extending window through which information on said disc is viewed,
   said window in radial alignment with range and gradient information appearing on said disc, and
   a smaller disc centrally located relative to said large disc, and rotatable about its center,
   said smaller disc having a radial window therein for exposing data on said large disc,
   whereby range data is determined by relating said cursor and said small disc to data on said large disc.

2. A device for providing sonar range information as claimed in claim 1; wherein,
   said range data on said large disc is determined by the formula:

$$\Delta X = D \cot (\theta_1 + \theta_2/2) \text{ where}$$

$\Delta X$ is range in kiloyards
$D$ is thickness of layers
$\theta_1$ is instant angle of the ray
$\theta_2$ is final angle of ray.

* * * * *